US 12,082,559 B1

(12) United States Patent
Li

(10) Patent No.: US 12,082,559 B1
(45) Date of Patent: Sep. 10, 2024

(54) AUTOMATIC ANIMAL DOOR

(71) Applicant: Xiong Li, Xiantao (CN)

(72) Inventor: Xiong Li, Xiantao (CN)

( * ) Notice: Subject to any disclaimer, the term of this patent is extended or adjusted under 35 U.S.C. 154(b) by 0 days.

(21) Appl. No.: 18/426,536

(22) Filed: Jan. 30, 2024

(51) Int. Cl.
    *A01K 31/00*     (2006.01)
    *A01K 31/02*     (2006.01)
    *E05F 15/78*     (2015.01)

(52) U.S. Cl.
    CPC .............. *A01K 31/02* (2013.01); *E05F 15/78* (2015.01)

(58) Field of Classification Search
    CPC ................................ A01K 31/02; E05F 15/78
    See application file for complete search history.

(56) References Cited

U.S. PATENT DOCUMENTS

| | | | | |
|---|---|---|---|---|
| 6,584,936 | B2* | 7/2003 | Rivard | A01K 1/031 |
| | | | | 119/419 |
| 10,352,085 | B1* | 7/2019 | Shaoul | E05F 15/665 |
| 11,533,891 | B1* | 12/2022 | Marki{hacek | E05F 15/665 |

* cited by examiner

*Primary Examiner* — Daniel J Troy
*Assistant Examiner* — Daniel Alvarez
(74) *Attorney, Agent, or Firm* — Daniel M. Cohn; Howard M. Cohn

(57) ABSTRACT

An automatic animal door includes a first door column, a second door column, a top plate, a door plate, and a driving mechanism. The first door column defines a first groove The second door column defines a second groove. The top plate is connected with a top end of the first door column and a top end the second door column. The top plate defines an entrance with the first door column and the second door column. The door plate is disposed between the first door column and the second door column. The door plate is movable along the first groove and the second groove to close or expose the entrance. The driving mechanism is disposed on the top plate. The driving mechanism is connected with the door plate to drive the door plate to move along the first groove and the second groove.

20 Claims, 12 Drawing Sheets

AUTOMATIC ANIMAL DOOR

TECHNICAL FIELD

The present disclosure relates to a field of animal entryway, and in particular to an automatic animal door.

BACKGROUND

When raising animals, it is common to provide at least two areas for the animals, where a first area is a safe house and a second area is an open space. The animals commonly move between the two areas. For instance, when the animals being raised are chickens, a chicken house and the open space are generally provided for the chickens to move around. The chicken house has a door. A user can open the door to allow the chickens in the chicken house to move around in the open space. The user can also close the door to keep the chickens in the chicken house after the chickens return to the chicken house. However, the door of the chicken house generally require the user to open or close manually, which is inconvenient to use.

SUMMARY

Embodiments of the present disclosure provide an automatic animal door, and a door plate thereof is conveniently driven to move through a driving mechanism thereof to close or expose an entrance thereof.

In one embodiment, the present disclosure provides the automatic animal door. The automatic animal door comprises a first door column, a second door column, a top plate, a door plate, and a driving mechanism. The first door column defines a first groove extending along a length direction thereof. The second door column is opposite to the first door column and is spaced apart from the first door column. The second door column defines a second groove extending along a length direction thereof. The first groove is opposite to the second groove.

The top plate is connected with a top end of the first door column and a top end the second door column. The top plate, the first door column, and the second door column are connected with define an entrance. The door plate is disposed between the first door column and the second door column. A first side of the door plate facing the first door column is clamped in the first groove. A second side of the door plate facing the second door column is clamped in the second groove. The door plate is movable along the first groove and the second groove to close or expose the entrance. The driving mechanism is disposed on the top plate. The driving mechanism is connected with the door plate to drive the door plate to move along the first groove and the second groove.

In some embodiments, the automatic animal door further comprises a bottom plate. The bottom plate is fixedly connected with a bottom end of the first door column and a bottom end of the second door column. A first end, facing the first door column, of the bottom plate is clamped in the first groove. A second end, facing the second door column, of the bottom plate is clamped in the second groove. When the door plate closes the entrance. One end, away from the top plate, of the door plate abuts against the bottom plate.

In some embodiments, a first protruding portion is convexly disposed at a one end, close to the bottom plate, of the first side of the door plate. A second protruding portion is convexly disposed on one end, close to the bottom plate, of the second side of the door plate. The first door column defines a first opening communicated with the first groove. The first opening is defined on the top end of the first door column. The second door column defines a second opening communicated with the second groove. The second opening is defined on the top end of the second door column. The top plate comprises a base plate portion, a first limiting portion, and a second limiting portion. The base plate portion and the door plate are sequentially disposed in a thickness direction of the automatic animal door. The first limiting portion is disposed on the top end of the first door column. The first limiting portion blocks a portion of the first opening. The first limiting portion prevents the first protruding portion from separating from the first groove. The second limiting portion is disposed on the top end of the second door column. The second limiting portion blocks a portion of the second opening. The second limiting portion prevents the second protruding portion from separating from the second groove.

In some embodiments, the first door column comprises a first base plate and a first limiting plate disposed on the first base plate. The first limiting plate comprises a first connecting portion and a first extending portion. The first connecting portion protrudes from the first base plate. The first extending portion extends from one end of the first connecting portion away from the first base plate toward the second door column. The first connecting portion, the first extending portion, and the first base plate form the first groove. The base plate portion defines a first accommodating groove corresponding to the first limiting plate. The first limiting plate is disposed in the first accommodating groove.

The second door column comprises a second base plate and a second limiting plate disposed on the second base plate. The second limiting plate comprises a second connecting portion and a second extending portion. The second connecting portion protrudes from the second base plate. The second extending portion extends from one end of the second connecting portion away from the second base plate toward the first door column. The second connecting portion, the second extending portion, and the second base plate form the second groove. The base plate portion defines a second accommodating groove corresponding to the second limiting plate. The second limiting plate is disposed in the second accommodating groove.

In some embodiments, the base plate portion covers the first base plate and the second base plate. The first limiting plate is disposed on one side of the first base plate facing the base plate portion. The second limiting plate is disposed on one side of the second base plate facing the base plate portion.

In some embodiments, a corner of the first limiting portion away from the second limiting portion is arc-shaped, and a corner of the second limiting portion away from the first limiting portion is arc-shaped.

In some embodiments, the driving mechanism comprises a driving motor and a gear. The driving motor is connected with the gear and drives the gear to rotate. Tooth holes are defined on the door plate along a length direction thereof. The gear is engaged with any one of the tooth holes to drive the door plate to move.

In some embodiments, the automatic animal door further comprises a cover covering the top plate. The cover defines a third accommodating groove facing the top plate. The driving mechanism is accommodated in the third accommodating groove. The cover comprises an upper cover plate disposed along a moving direction of the door plate. The upper cover plate is disposed away from the bottom plate.

The upper cover plate defines an upper notch. The door plate is allowed to pass through the upper cover plate from the upper notch.

In some embodiments, the automatic animal door further comprises a battery and a solar panel. The battery is disposed in the third accommodating groove. The battery is connected with the driving mechanism. The battery supplies power to the driving mechanism. The solar panel is disposed outside the cover. The solar panel is connected with the battery to supply power to the battery.

In some embodiments, the automatic animal door further comprises a connecting rod. A first end of the connecting rod is connected with the solar panel. A second end of the connecting rod is connected with the cover. The solar panel is spaced apart from the cover.

In some embodiments, the connecting rod is rotatable relative to the cover to drive the solar panel to rotate relative to the cover.

In some embodiments, the solar panel is rotatably connected with the connecting rod, and the solar panel is rotatable relative to the connecting rod.

In some embodiments, the automatic animal door further comprises a display screen disposed in the third accommodating groove. The cover comprises a light-transmitting area. The light-transmitting area directly faces the display screen.

In some embodiments, the display screen comprises display areas. The display areas display at least one of current time, a remaining electric quantity, a light intensity of ambient light, a door opening light intensity, a door closing light intensity, door opening time, and door closing time. When the light intensity of the ambient light is greater than the door opening light intensity, the driving mechanism drives the door plate to expose the entrance. When the light intensity of the ambient light is less than the door closing light intensity, the driving mechanism drives the door plate to close the entrance. When the current time reaches the door opening time, the driving mechanism drives the door plate to expose the entrance. When the current time reaches the door closing time, the driving mechanism drives the door plate to close the entrance.

In some embodiments, the automatic animal door further comprises a circuit board and a battery, the circuit board is disposed in the third accommodating groove. The circuit board is disposed on one side of the display screen facing the top plate. The circuit board is connected with the display screen. The battery is disposed in the third accommodating groove. The battery is connected with the driving mechanism, the circuit board, and the display screen. The battery, the driving mechanism, and the circuit board are disposed side by side.

In some embodiments, the automatic animal door further comprises control buttons. The control buttons are at least partially disposed outside the cover. The control buttons are connected with the circuit board. The control buttons are configured to change display contents of the display screen.

In some embodiments, the automatic animal door further comprises a light sensor. The light sensor is connected with the driving mechanism. The light sensor is configured to detect a light intensity of an ambient light signal and is configured to control the driving mechanism to drive the door plate according to the light intensity of the ambient light signal.

In some embodiments, the light sensor comprises a full-spectrum sensing lamp bead, and the full-spectrum sensing lamp bead is configured to detect the ambient light signal of a full spectrum.

In some embodiments, the light sensor comprises a sensing lamp bead and a full-spectrum lens. Ambient light of a full spectrum is allowed to penetrate the full-spectrum lens, so that the sensing lamp bead detects the ambient light signal of a full spectrum.

In some embodiments, the automatic animal door further comprises a wireless communication module connected with the driving mechanism. The wireless communication module is configured to receive a wireless control instruction and control the driving mechanism to drive the door plate to move according to the wireless control instruction.

In the embodiments of the present disclosure, the top plate is connected with the top end of the first door column and the top end of the second door column and forms the entrance with the first door column and the second door column. The first door column defines the first groove, the second door column defines the second groove, and the first side and the second side of the door plate are respectively clamped in the first groove and the second groove. The driving mechanism drives the door plate to move along the first groove and the second groove to close or expose the entrance. The door plate is conveniently controlled to move through the driving mechanism, so the door plate does not need to be manually opened or closed, and the operation is convenient and easy. The first door column, the second door column, the top plate, the door plate, and the driving mechanism basically form the automatic animal door without complicated structures and components. Therefore, a structure of the automatic animal door is simple, compact, and reliable.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where same reference numbers in the following description indicate same structures.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
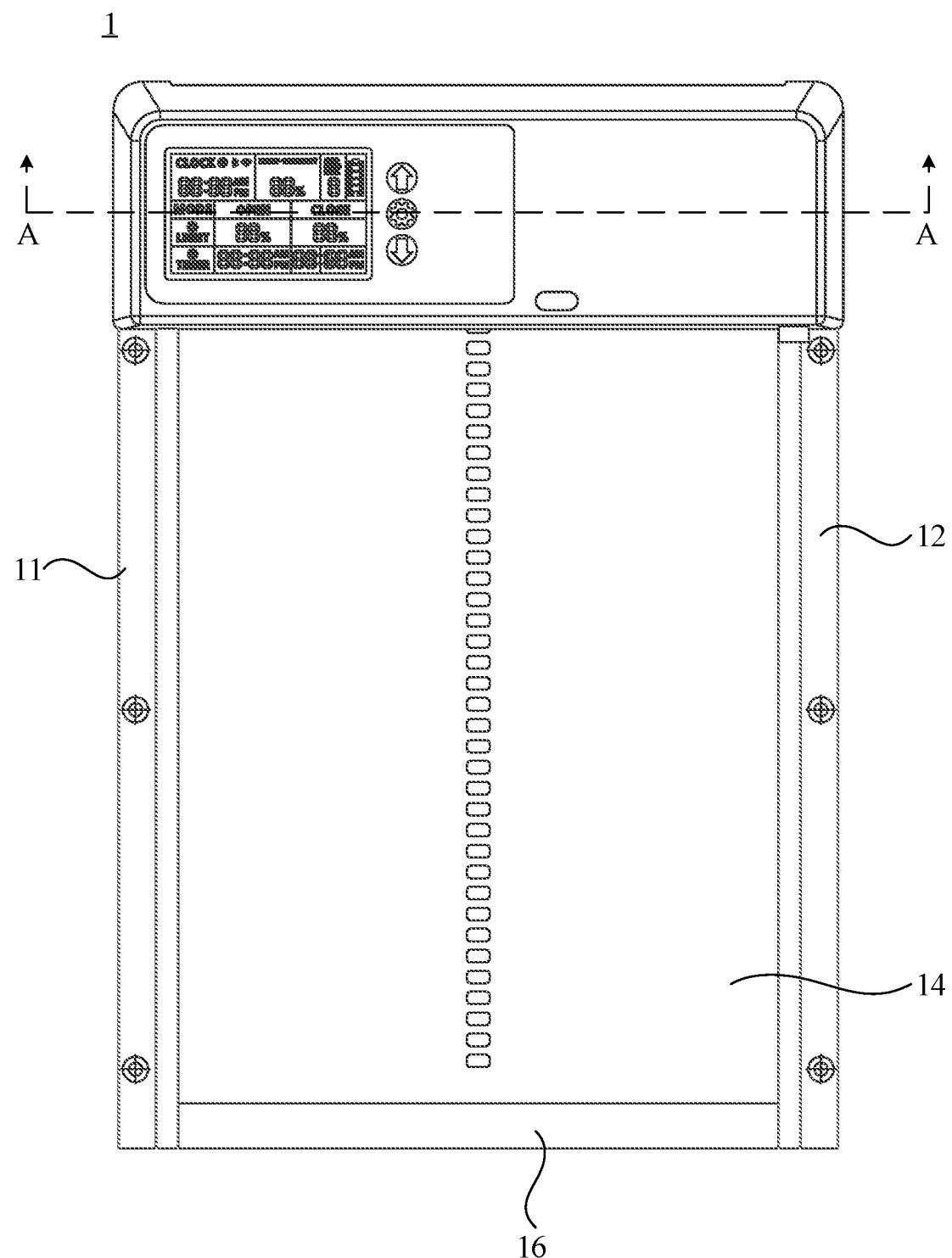
FIG. 1 is a schematic diagram of an automatic animal door according to one embodiment of the present disclosure.
Figure 2:
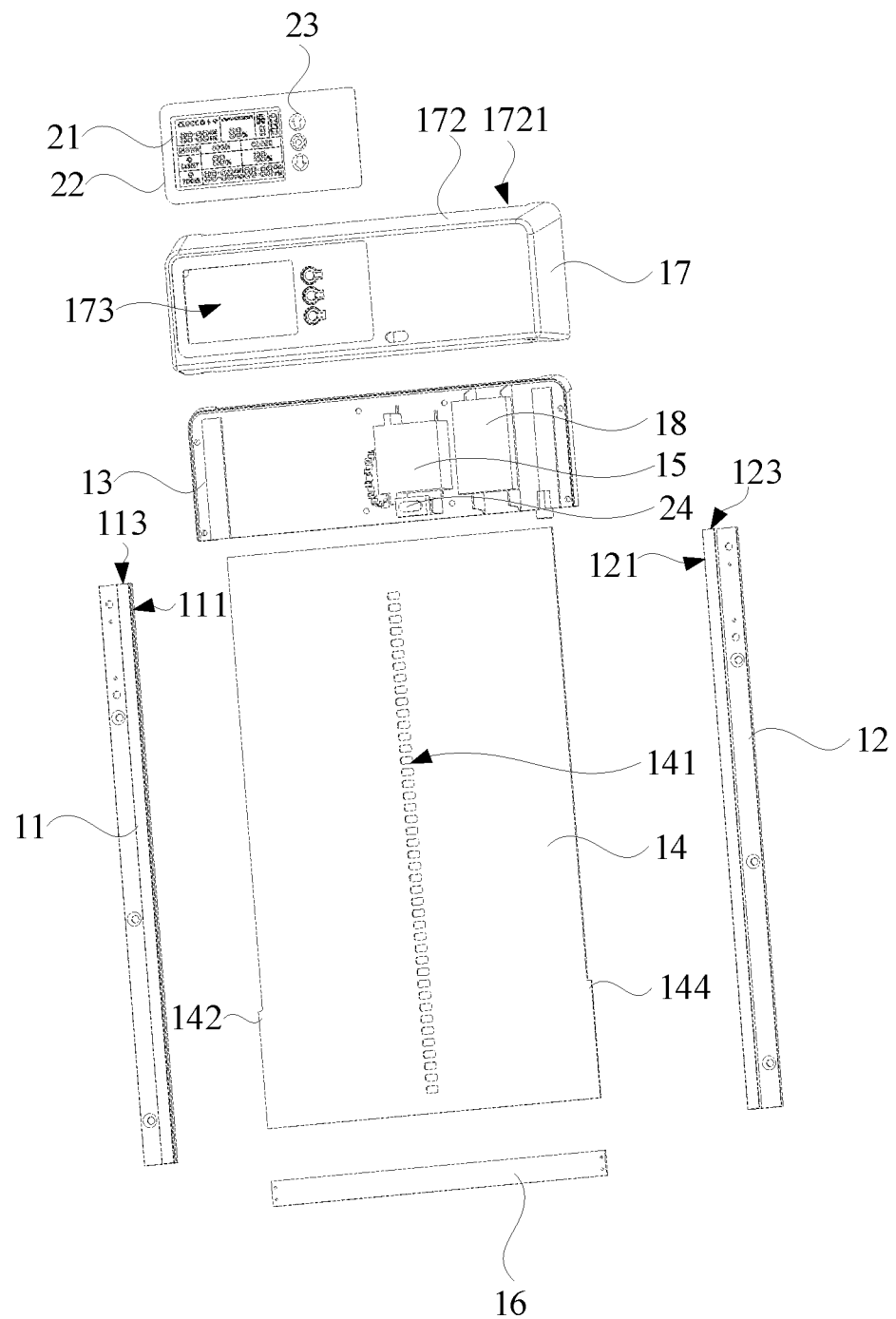
FIG. 2 is an exploded schematic diagram of the automatic animal door shown in FIG. 1.
Figure 3:
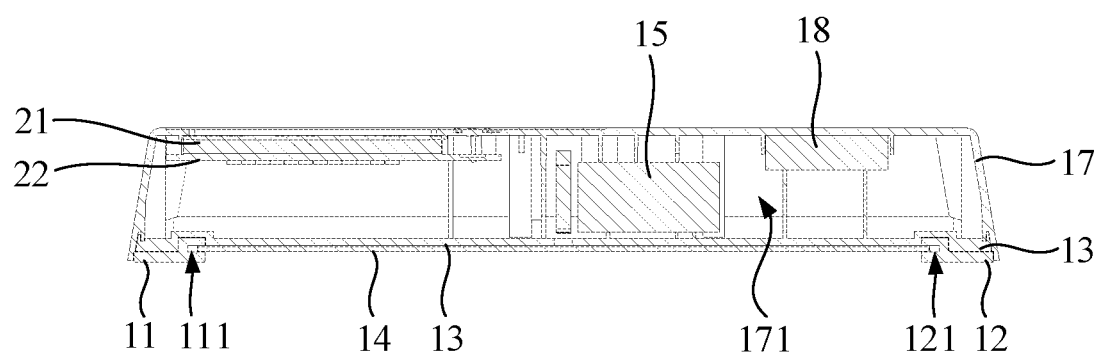
FIG. 3 is a cross-sectional schematic diagram of the automatic animal door taken along the line A-A shown in FIG. 1.

Embodiments of the present disclosure provide an automatic animal door. As shown in FIGS. 1-3, FIG. 1 is a schematic diagram of the automatic animal door according to one embodiment of the present disclosure, FIG. 2 is an exploded schematic diagram of the automatic animal door shown in FIG. 1, and FIG. 3 is a cross-sectional schematic diagram of the automatic animal door taken along the line A-A shown in FIG. 1. The automatic animal door 1 can be applied in chicken farms, duck farms, or places where other animals are raised. The embodiments of the present disclosure do not limit types of animals raised.

The automatic animal door 1 comprises a first door column 11, a second door column 12, a top plate 13, a door plate 14, and a driving mechanism 15. The first door column 11 defines a first groove 111 extending along a length direction thereof. The second door column 12 is opposite to the first door column 11 and is spaced apart from the first door column 11. The second door column 12 defines a second groove 121 extending along a length direction thereof. The first groove 111 is opposite to the second groove 121.

The first door column 11 and the second door column 12 are served as left and right door columns of the automatic animal door 1. A distance between the first door column 11 and the second door column 12 is predetermined as needed. For instance, the distance between the first door column 11 and the second door column 12 is predetermined according to a width of a door of an animal house (such as a chicken house). The first door column 11 defines the first groove 111 on one side facing the second door column 12, and the second door column 12 defines the second groove 121 on one side facing the first door column 11. The first groove 111 extends along the length direction of the first door column 11, and the second groove 121 extends along the length direction of the second door column 12. The top plate 13 is connected with a top end of the first door column 11 and a top end the second door column 12. The top plate 13, the first door column 11, and the second door column 12 are connected with define an entrance.

Figure 4:
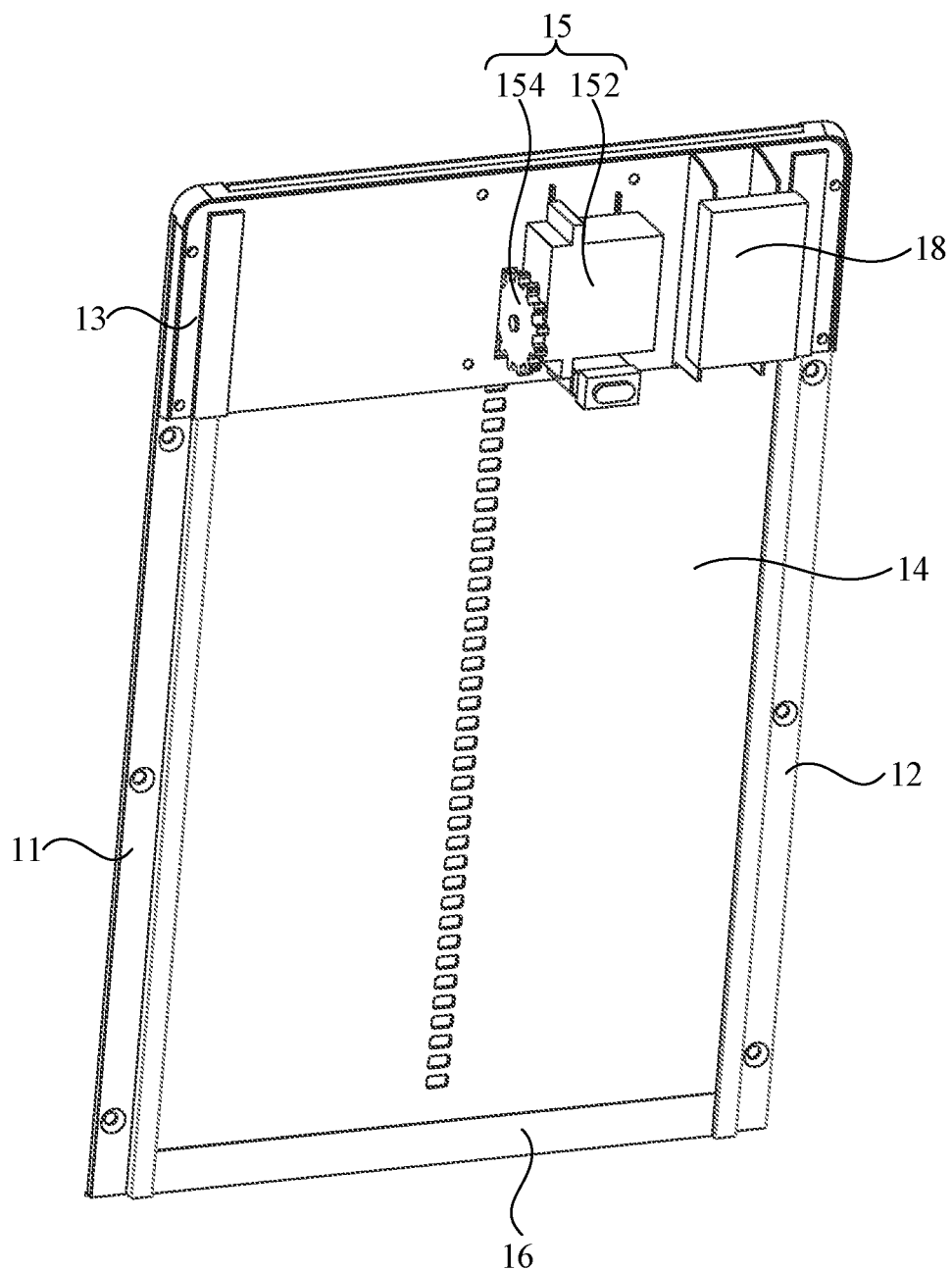
FIG. 4 is a schematic diagram of portions of the automatic animal door shown in FIG. 1.

As shown in FIG. 4, FIG. 4 is a schematic diagram of portions of the automatic animal door shown in FIG. 1. The door plate 14 is disposed between the first door column 11 and the second door column 12. A first side of the door plate 14 facing the first door column 11 is clamped in the first groove 111. A second side of the door plate 14 facing the second door column 12 is clamped in the second groove 121. The door plate 14 is movable along the first groove 111 and the second groove 121 to close or expose the entrance. The driving mechanism 15 is disposed on the top plate 13. The driving mechanism 15 is connected with the door plate 14 to drive the door plate 14 to move along the first groove 111 and the second groove 121.

The top plate 13 is connected with the top end of the first door column 11 and the top end the second door column 12. The top plate 13, the first door column 11, and the second door column 12 are connected with define the entrance. The first door column 11 defines the first groove 111, and the second door column 12 defines the second groove 121. The first side and the second side of the door plate 14 are respectively disposed in the first groove 111 and the second groove 121. The driving mechanism 15 drives the door plate 14 to move along the first groove 111 and the second groove 121 to close or expose the entrance. The door plate 14 is conveniently controlled to move through the driving mechanism 15, so the door plate 14 does not need to be manually opened or closed, and the operation is convenient and easy. The first door column 11, the second door column 12, the top plate 13, the door plate 14, and the driving mechanism 15 basically form the automatic animal door without complicated structures and components. Therefore, a structure of the automatic animal door is simple, compact, and reliable.

In some embodiments, the automatic animal door further comprises a bottom plate 16. The bottom plate 16 is fixedly connected with a bottom end of the first door column 11 and a bottom end of the second door column 12. A first end, facing the first door column 11, of the bottom plate 16 is clamped in the first groove 111. A second end, facing the second door column 12, of the bottom plate 16 is clamped in the second groove 121. When the door plate 14 closes the entrance. One end, away from the top plate 13, of the door plate 14 abuts against the bottom plate 16.

The top plate 13 and the bottom plate 16 are disposed on two ends of the first door column 11 and two ends of the second door column 12 to form the entrance, so that farmed animals can enter and leave the house through the entrance. The top plate 13, the first door column 11, the second door column 12, and the bottom plate 16 are connected with each other, which improve a connection strength of the automatic animal door 1 and improve an overall firmness of the automatic animal door 1. In addition, when the door plate 14 falls to a lowest point, the door plate abuts against an upper end of the bottom plate 16, making an connection between the door plate 14 and the bottom plate 16 tight, which avoids a problem such as loose connection between the door plate 14 and the ground due to uneven ground, and a problem such as tilting of the door plate14 due to uneven long-term stress.

In some embodiments, a thickness of the bottom plate 16 is greater than a thickness of the door plate 14, so that the bottom plate 16 well support the door plate 14. The bottom plate 16 is fixedly connected with the first door column 11 and the second door column 12. The bottom plate 16 is engaged with the first groove 111 and the second groove 121. The door plate 14 needs to move within the first groove 111 and the second groove 121, so the thickness of the door plate 14 is less than a thickness of the first groove 111 and a thickness of the second groove 121. Namely, there is a certain gap between the door plate14 and a groove wall of the first groove 111, and there is a certain gap between the door plate 14 and a groove wall of the second groove 121.

The bottom plate 16 may be fixedly connected with the first door column 11 and the second door column 12 by screwing, snapping, gluing, etc.

Materials of the first door column 11, the second door column 12, the top plate 13, the door plate 14, and the bottom plate 16 are selected as needed. In some embodiments, the first door column 11, the second door column 12, and the bottom plate 16 are made of metal and formed by metal extrusion or stamping. The top plate 13 and the door plate 14 are made of plastic or other materials. In other alternative embodiments, the first door column 11, the second door column 12, the top plate 13, the door plate 14, and the bottom plate 16 are made of metal or plastic.

Figure 5:
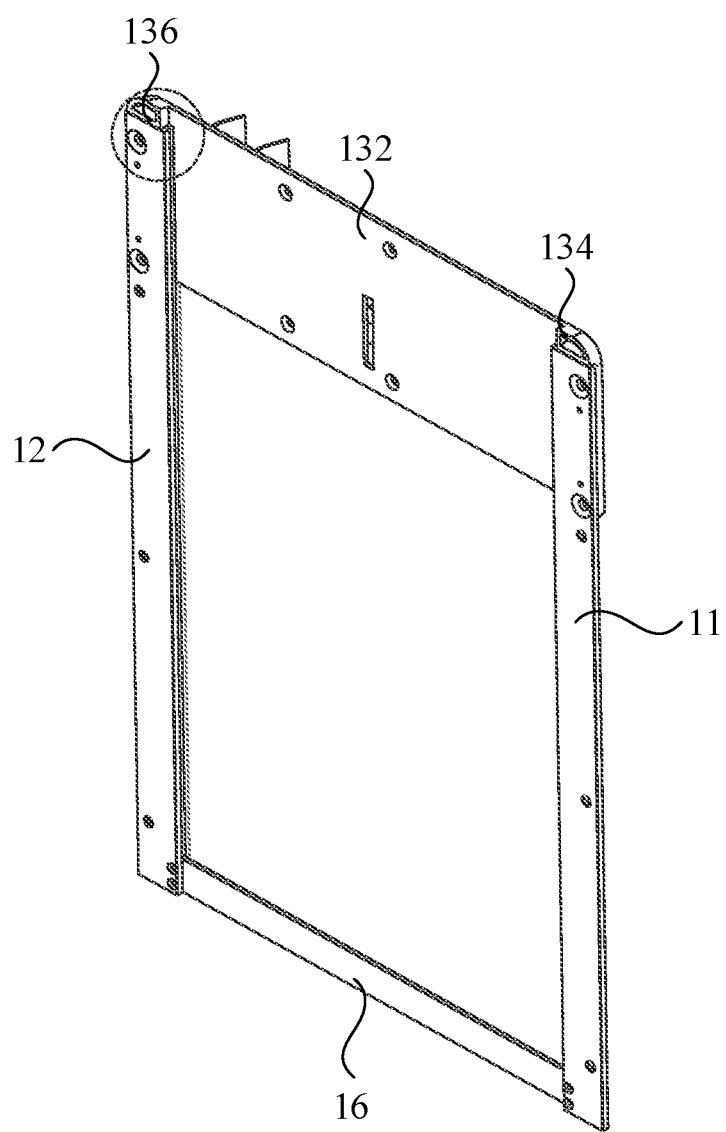
FIG. 5 is another schematic diagram of the portions of the automatic animal door shown in FIG. 1.
Figure 6:
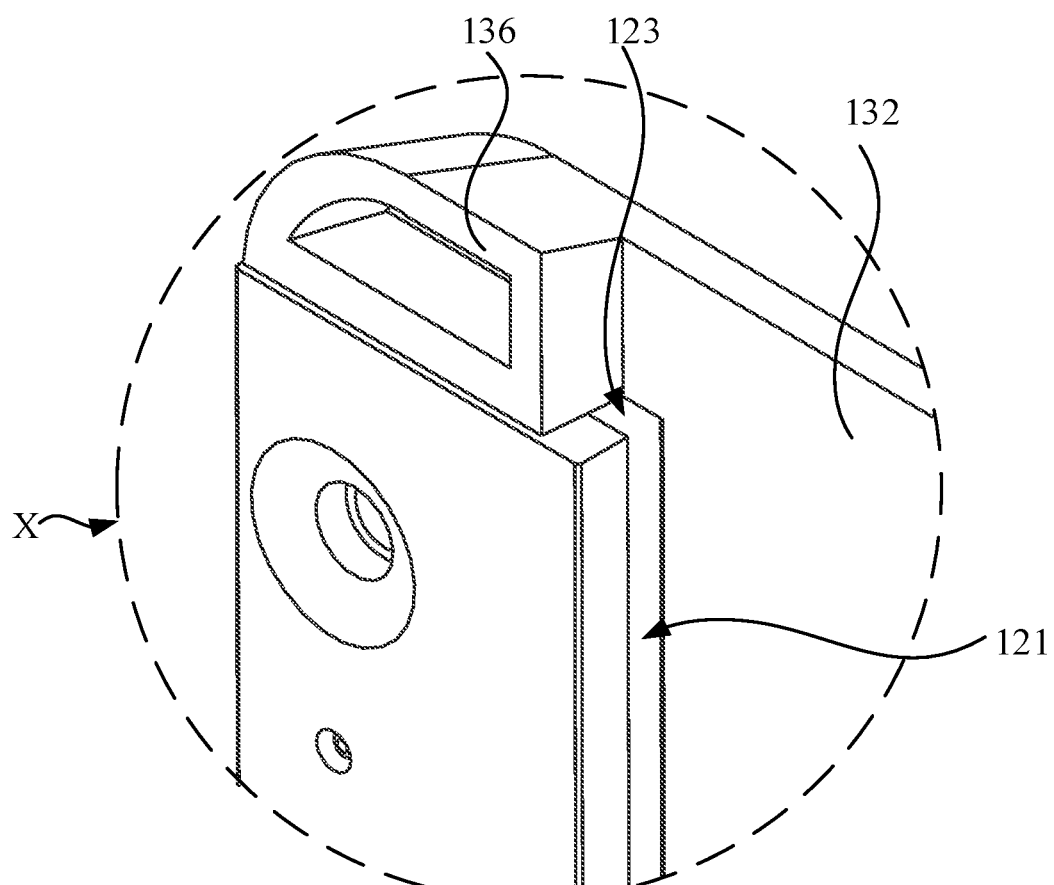
FIG. 6 is an enlarged schematic diagram of portions X of the automatic animal door shown in FIG. 5.

As shown in FIGS. 3, 5, and 6, FIG. 5 is another schematic diagram of the portions of the automatic animal door shown in FIG. 1, and FIG. 6 is an enlarged schematic diagram of portions X of the automatic animal door shown in FIG. 1. In FIG. 4, the door plate is not shown. In some embodiments, a first protruding portion 142 is convexly disposed at a one end, close to the bottom plate 16, of the first side of the door plate 14. A second protruding portion 144 is convexly disposed on one end, close to the bottom plate 16, of the second side of the door plate 14. The first protruding portion 142 is movable within the first groove 111, and the second protruding portion 144 is movable within the second groove 121.

The first door column 11 defines a first opening 113 communicated with the first groove 111. The first opening 113 is defined on the top end of the first door column 11 (i.e., one end of the first door column 11 away from the bottom plate 16). The second door column 12 defines a second opening 123 communicated with the second groove 121. The second opening is defined on the top end of the second door column 12 (i.e., one end of the second door column 12 away from the bottom plate 16). A portion of the door plate 14 is movable from the first opening 113 and the second opening 123 to outside the first groove 111 and the second groove 121 to expose the entrance.

The top plate 13 comprises a base plate portion 132, a first limiting portion 134, and a second limiting portion 136. The base plate portion 132 and the door plate 14 are sequentially disposed in a thickness direction of the automatic animal door 1. The first limiting portion 134 is disposed on the top end of the first door column 11. The first limiting portion 134 blocks a portion of the first opening 113. The first limiting portion 134 prevents the first protruding portion 142 from separating from the first groove 111. The second limiting portion 136 is disposed on the one end of the second door column away from the bottom plate. The second limiting portion 136 blocks a portion of the second opening 123. The second limiting portion 136 prevents the second protruding portion 144 from separating from the second groove 121.

The first limiting portion 134 and the second limiting portion 136 position the first protruding portion 142 and the second protruding portion 144, so that the door plate 14 is prevented from completely separating the first groove 111 and the second groove 121. Therefore, the door plate 14 moves stably in the first groove 111 and the second groove 121.

Figure 7:
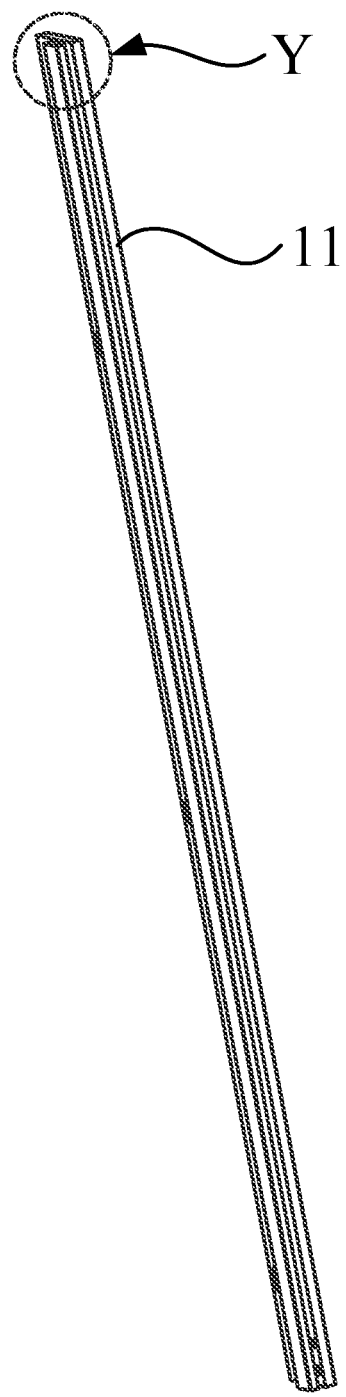
FIG. 7 is a schematic diagram of a first door column of the automatic animal door shown in FIG. 1.
Figure 8:
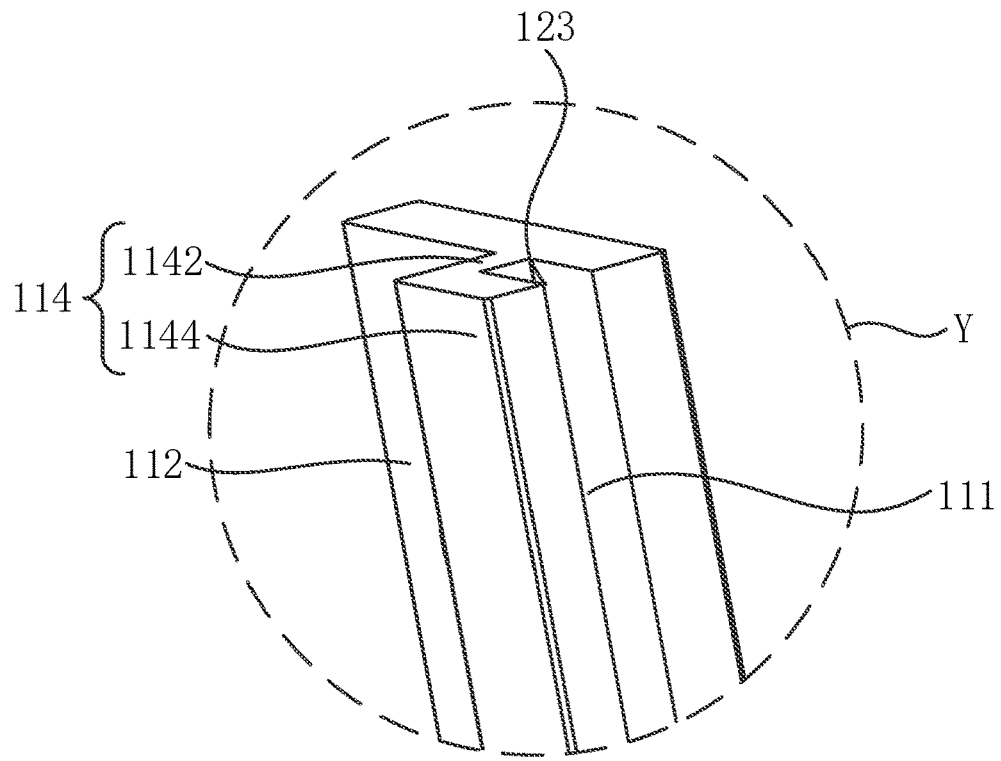
FIG. 8 is an enlarged schematic diagram of portions Y of the first door column shown in FIG. 7.

As shown in FIGS. 7 and 8, FIG. 7 is a schematic diagram of the first door column of the automatic animal door shown in FIG. 1, and FIG. 6 is an enlarged schematic diagram of portions Y of the first door column shown in FIG. 7. In some embodiments, the first door column 11 comprises a first base plate 112 and a first limiting plate 114 disposed on the first base plate. The first limiting plate 114 comprises a first connecting portion 1142 and a first extending portion 1144.

The first connecting portion 1142 protrudes from the first base plate 112. The first extending portion 1144 extends from one end of the first connecting portion 1142 away from the first base plate 112 toward the second door column 12. The first connecting portion 1142, the first extending portion 1144, and the first base plate 112 form the first groove 11. The base plate portion defines a first accommodating groove corresponding to the first limiting plate 114. The first limiting plate 114 is disposed in the first accommodating groove. A structure of the first door column 11 is simple and easy to manufacture. The first limiting plate 114 is disposed on the first base plate 112 to form the first door column 11. The first door column 11 may also be made by stamping or other methods.

Figure 9:
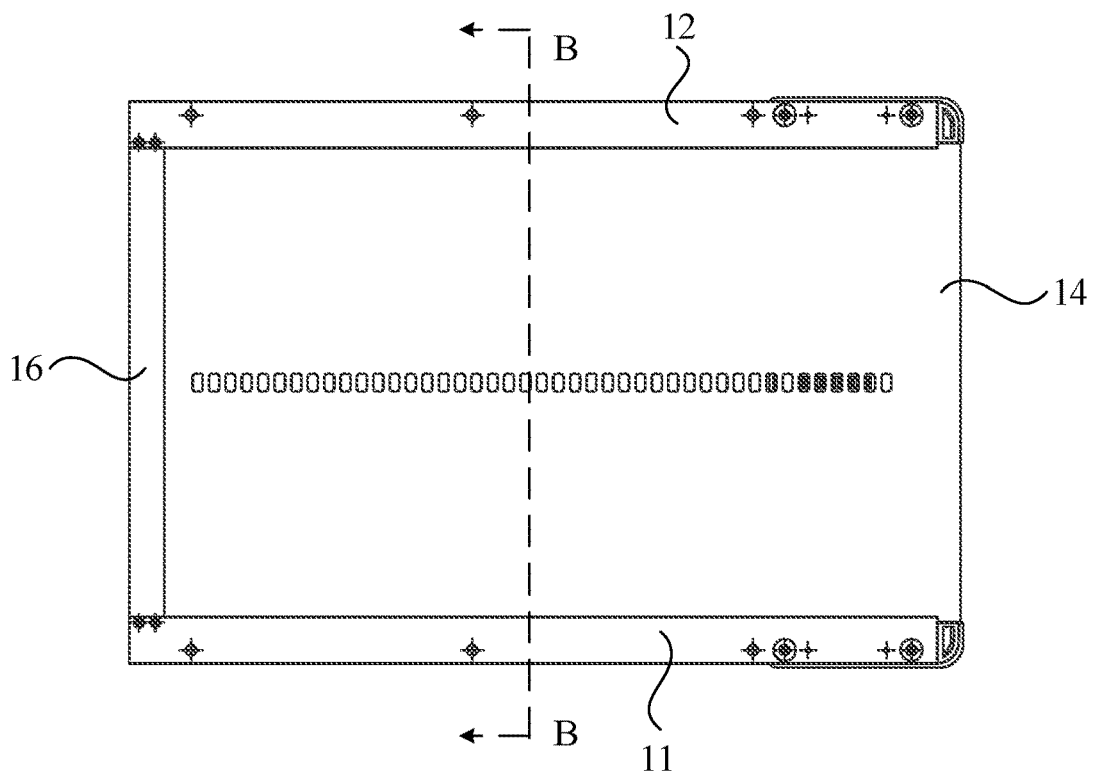
FIG. 9 is another schematic diagram of the automatic animal door according to one embodiment of the present disclosure.
Figure 10:
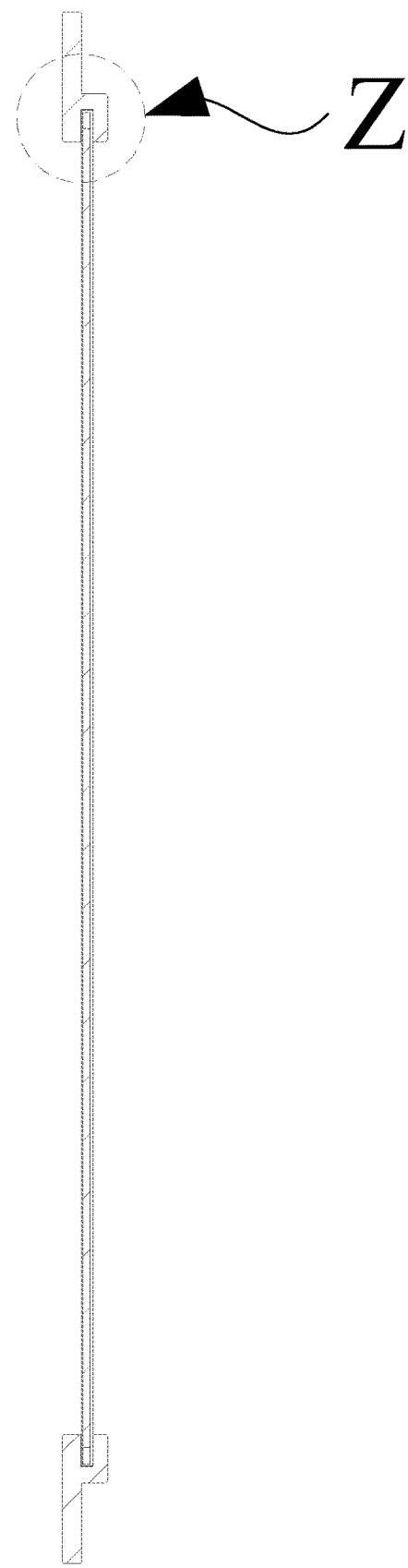
FIG. 10 is a cross-sectional schematic diagram of the automatic animal door taken along the line B-B shown in FIG. 9.
Figure 11:
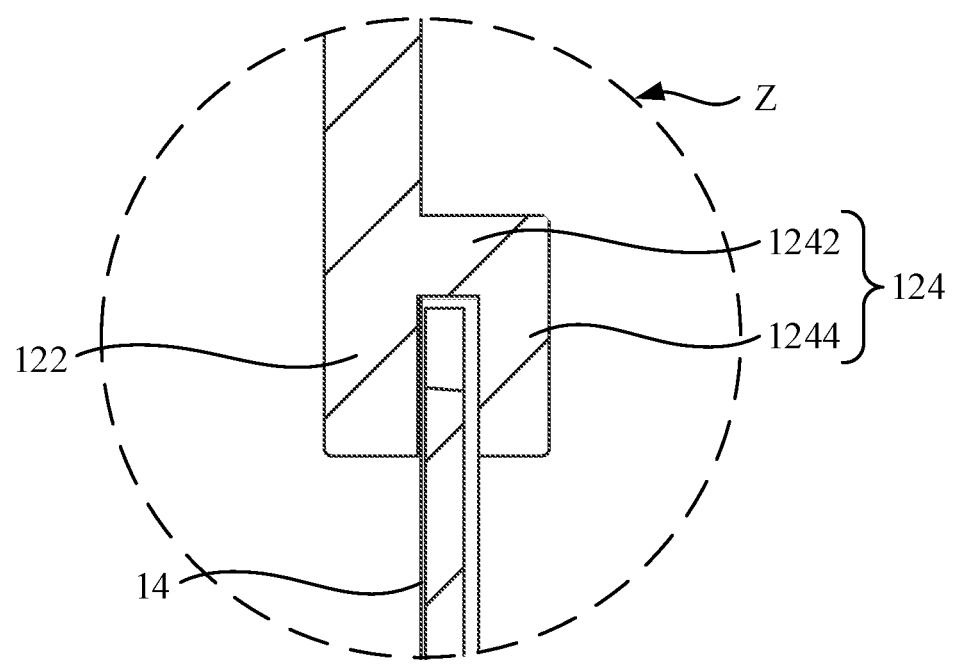
FIG. 11 is an enlarged schematic diagram of portions Z shown in FIG. 10.

As shown in FIGS. 9-11, FIG. 9 is another schematic diagram of the automatic animal door according to one embodiment of the present disclosure, FIG. 10 is a cross-sectional schematic diagram of the automatic animal door taken along the line B-B shown in FIG. 9, and FIG. 11 is an enlarged schematic diagram of portions Z shown in FIG. 10. The second door column 12 comprises a second base plate 122 and a second limiting plate 124 disposed on the second base plate 122. The second limiting plate 124 comprises a second connecting portion 1242 and a second extending portion 1244. The second connecting portion 1242 protrudes from the second base plate 122. The second extending portion 1244 extends from one end of the second connecting portion 1242 away from the second base plate 122 toward the first door column 11. The second connecting portion 1242, the second extending portion 1244, and the second base plate 122 form the second groove 121. The base plate portion defines a second accommodating groove corresponding to the second limiting plate 124. The second limiting plate 124 is disposed in the second accommodating groove. The second limiting plate 124 is disposed on the second base plate 122 to form the second door column 12. The second door column 12 may also be made by stamping or other methods.

It is understood that the first base plate 112 is fixedly connected with an external structure. For instance, a first portion of the first base plate 112 and the first limiting plate 114 define the first groove 111, a second portion of the first base plate 112 is staggered with the first limiting plate 114, and the second portion of the first base plate 112 may be fixedly connected with a first side wall of the animal house. Optionally, the second portion of the first base plate 112 may be fixed on the first side wall of the animal house by screwing, riveting, or welding. The second base plate 122 may also be fixedly connected with the external structure. For instance, a first portion of the second base plate 122 and the second limiting plate 124 define the second groove 121, a second portion of the second base plate 122 is staggered with the second limiting plate 124, and the second portion of the second base plate 122 may be fixedly connected with a second side wall of the animal house. Optionally, the second portion of the second base plate 122 may be fixed on the second side wall of the animal house by screwing, riveting or welding.

In some embodiments, the base plate portion 132 covers the first base plate 112 and the second base plate 122. The first limiting plate 114 is disposed on one side of the first base plate 112 facing the base plate portion 132. The second limiting plate 124 is disposed on one side of the second base plate 122 facing the base plate portion 132. The first limiting plate 114 is disposed between the first base plate 112 and the base plate portion 132, and the second limiting plate 124 is disposed between the second base plate 122 and the base plate portion 132. A connecting surfaces between the first limiting plate 114 and the first side wall of the animal house is flat and a connecting surface between the second limiting plate 124 and the second side wall of the animal house is flat, which facilitates connections between the first limiting plate 114, the second limiting plate 124, and the side walls of the animal house.

In some embodiments, a corner of the first limiting portion 134 away from the second limiting portion 136 is arc-shaped, and a corner of the second limiting portion 136 away from the first limiting portion 134 is arc-shaped. The corner of the first limiting portion 134 and the corner of the second limiting portion 136 are arc-shaped, preventing the user or the farmed animals from being scratched.

As shown in FIGS. 2-4, in some embodiments, the driving mechanism 15 comprises a driving motor 152 and a gear 154. The driving motor 152 is connected with the gear 154 and drives the gear 154 to rotate. Tooth holes 141 are defined on the door plate 14 along a length direction thereof. The gear 154 is engaged with any one of the tooth holes 141 to drive the door plate 14 to move.

For instance, he driving motor 152 forwardly rotates to drive the gear 154 to forwardly rotate, thereby moving the door plate 14 along the first groove 111 and the second groove 121 in one direction, such as a direction away from the bottom plate 16, thus exposing the entrance. Similarly, the driving motor 152 reversely rotates to drive the gear 154 to reversely rotate, thereby moving the door plate 14 along the first groove 111 and the second groove 121 in another direction, such as a direction toward the bottom plate 16, thereby closing the entrance. The gear 154 comprises teeth that are spaced apart. At least three teeth are engaged with three of the tooth holes 141 at the same time and thus driving the door plate 14 to move.

In some embodiments, the automatic animal door 1 further comprises a cover 17 covering the top plate 13. The cover 17 defines a third accommodating groove 171 facing the top plate 13. The driving mechanism 15 is accommodated in the third accommodating groove 171. The cover 17 comprises an upper cover plate 172 disposed along a moving direction of the door plate 14. The upper cover plate 172 is disposed away from the bottom plate 16. The upper cover plate 172 defines an upper notch 1721. The door plate 14 is allowed to pass through the upper cover plate 172 from the upper notch 1721. The cover 17 shields and protects the driving mechanism 15 and other components therein, and the upper cover plate 172 of the cover 17 defines the upper notch 1721 allowing the door plate 14 to pass through, thereby allowing movement of the door plate 14.

In some embodiments, the automatic animal door 1 further comprises a battery 18. The battery 18 is disposed in the third accommodating groove 171. The battery 18 is connected with the driving mechanism 15. The battery 18 supplies power to the driving mechanism 15, so there is no need to lay wires, which facilitates an installation and use of the automatic animal door 1. It is convenient for the user to install the automatic animal door 1 where needed, without a need to consider laying wires, which simplifies the installation process of the automatic animal door 1 and expands a use scope of the automatic animal door 1.

In other embodiments, the automatic animal door 1 is connected with a power source through laid wires, and the driving mechanism 15 is powered through a power source.

Figure 12:
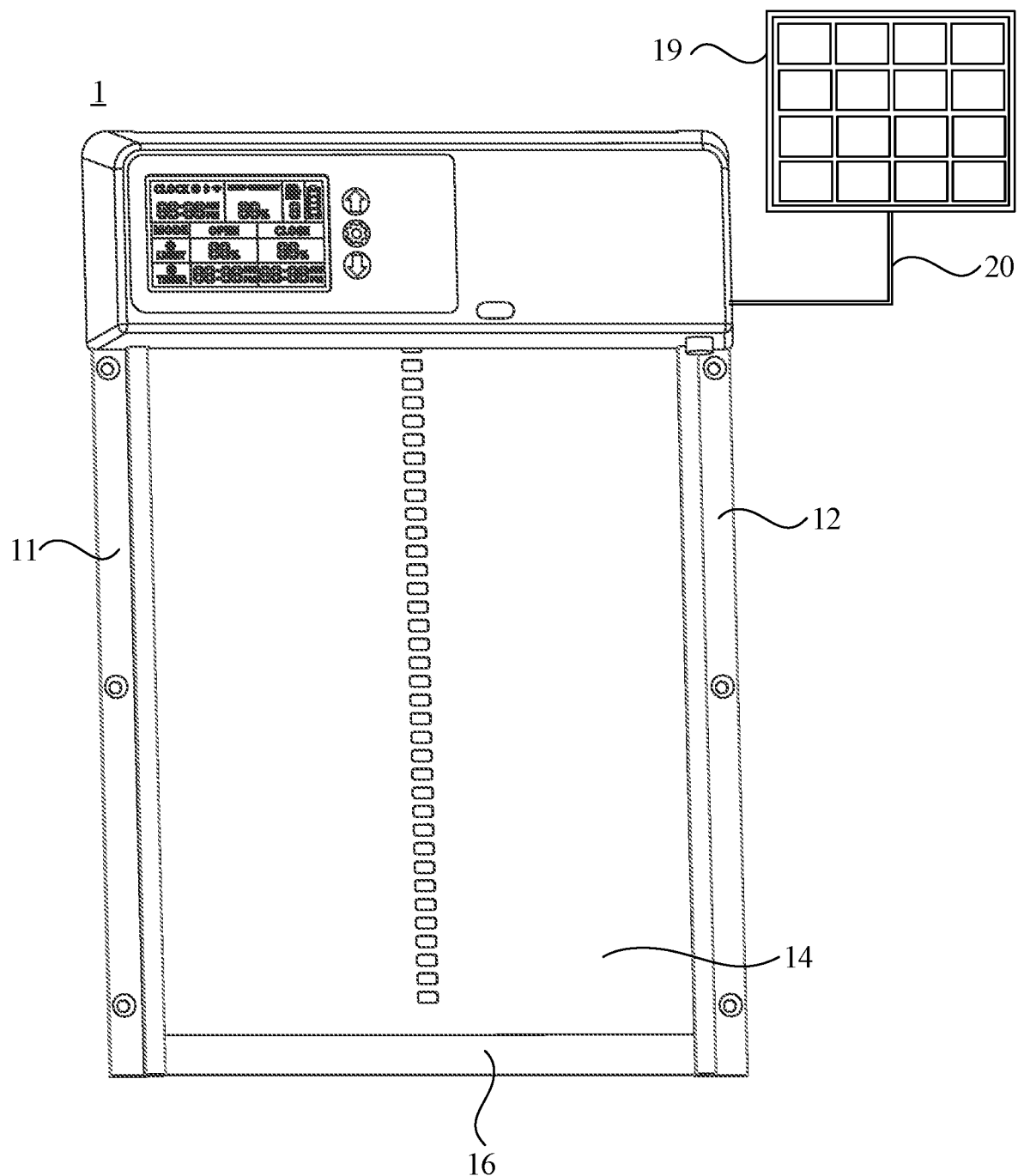
FIG. 12 is a schematic diagram of the automatic animal door according to another embodiment of the present disclosure.

As shown in FIG. 12, FIG. 12 is a schematic diagram of the automatic animal door according to another embodiment of the present disclosure. In some embodiments, the automatic animal door 1 further comprises a solar panel 19. A difference between the automatic animal door 1 herein and the automatic animal door 1 mentioned above is the solar panel 19. The solar panel 19 is disposed outside the cover 17. The solar panel 19 is connected with the battery 18 to supply power to the battery 18. The solar panel 19 continuously supplies power to the battery 18, so that the battery 18 has enough electric energy for the driving mechanism 15 and there is no need for the user to replace the battery 18 or manually charge the battery 18, which reduces a workload of the use. Further, It prevents the door plate 14 from being unable to be opened or closed in time due to failure to replace the battery 18 or manually charge the battery 18 in time.

In some embodiments, the solar panel 19 is directly disposed on the cover 17 to facilitate the installation of the solar panel 19.

In some embodiments, the automatic animal door 1 further comprises a connecting rod 20. A first end of the connecting rod 20 is connected with the solar panel 19. A second end of the connecting rod 20 is connected with the cover 17. The solar panel 19 is spaced apart from the cover 17. The solar panel 19 is connected with the cover 17 through the connecting rod 20. The solar panel 19 is allowed to be installed away from the cover 17 as needed. An installation position thereof is flexible so the solar panel well collects solar energy.

In some embodiments, the connecting rod 20 is rotatable relative to the cover 17 to drive the solar panel 19 to rotate relative to the cover 17. A positions of the connecting rod 20 relative to the cover 17 is adjusted as needed, so that the solar panel 19 well collects the solar energy.

In some alternative embodiments, the solar panel 19 is rotatably connected with the connecting rod 20, and the solar panel 19 is rotatable relative to the connecting rod 20. A positions of the solar panel 19 relative to the connecting rod 20 is adjusted as needed, so that the solar panel 19 well collects the solar energy.

In some embodiments, the connecting rod 20 includes rod parts, and the rod parts are rotatable relative to each other to adjust the position of the solar panel 19, so that the solar panel 19 well collects the solar energy.

It should be noted that rotating structure between the connecting rod 20 and the cover 17, and rotating structures between the connecting rod 20 and the solar panel 19 may be set as needed. For example, the connecting rod 20 is rotatable along an axis of the connecting rod 20 relative to the cover 17 or the solar panel 19.

In some embodiments, the automatic animal door 1 further comprises a display screen 21 disposed in the third accommodating groove 171. The cover 17 comprises a light-transmitting area 173. The light-transmitting area 173 directly faces the display screen 21.

The display screen 21 is configured to display contents through the light-transmitting area. The light-transmitting area 173 does not affect content displayed on the display screen 21 and protects the display screen 21. The light-transmitting area 173 of the cover 17 may be a structure made of transparent material, or may be a through hole. When the light-transmitting area 173 of the cover 17 is a through hole, the automatic animal door 1 further comprises a patch covering the through hole to protect the display screen 21. The patch is at least partially transparent to expose the display contents of the display screen 21. The patch may be made from polyvinyl chloride (PVC), etc.

In some embodiments, the display screen 21 comprises display areas. The display areas display at least one of current time, a remaining electric quantity, a light intensity of ambient light, a door opening light intensity, a door closing light intensity, door opening time, and door closing time. When the light intensity of the ambient light is greater than the door opening light intensity, the driving mechanism 15 drives the door plate 14 to expose the entrance. When the light intensity of the ambient light is less than the door closing light intensity, the driving mechanism 15 drives the door plate 14 to close the entrance. When the current time reaches the door opening time, the driving mechanism 15 drives the door plate 14 to expose the entrance. When the current time reaches the door closing time, the driving mechanism 15 drives the door plate 14 to close the entrance.

Figure 13:
FIG. 13 is a schematic diagram of a display screen of the automatic animal door according to one embodiment of the present disclosure.

As shown in FIG. 13, FIG. 13 is a schematic diagram of a display screen of the automatic animal door according to one embodiment of the present disclosure. In some embodiments, the display screen 21 comprises five display areas.

A first display area is located in an upper right corner of the display screen 21, and is configured to display power of the battery. In some embodiments, the first display area displays a pattern of the battery 18. There are a total of 4 bars inside the pattern of the battery 18, and each of the bars represents 25% of the power. When the battery is lower than one bar, the automatic animal door alarms, indicating that the power of the battery is not enough. Of course, the first display area may also displays the power in other ways, such as directly displaying the number corresponding to remaining power of the battery 18.

A second display area is located in an upper middle portion of the display screen 21. The second display area is configured to display the current time. In some embodiments, the second display area displays a character and a pattern corresponding to the current time, such as a CLOCK character and a clock pattern, and a 12-hour or 24-hour time display is shown below the character and the pattern. If the current time is displayed in the 12-hour clock, when it is morning, a pattern "AM" is displayed after the numbers corresponding to the current time, and if it is afternoon, "PM" is displayed after the numbers corresponding to the current time. The patterns "AM" and "PM" are alternatively displayed.

A third display area is located at an upper left corner of the display screen 21. The third display area is configured to display the light intensity. In some embodiments, the third display area displays letters "LIGHT-INTENSIFY", and the letters "LIGHT-INTENSIFY" are fixedly displayed, and an intensity percentage is displayed below the letters "LIGHT-INTENSIFY", where a symbol "%" is fixedly displayed.

A fourth display area is located at an upper right corner of the display screen 21. The fourth display area is configured to display anti-pitch level. In some examples, the fourth display area displays letters "ANTI-PINCH LEVE", and the letters "ANTI-PINCH LEVE" are fixedly displayed. A corresponding level value is displayed below the letters "ANTI-PINCH LEVE", and the corresponding level value is between 01-10.

A fifth display area is located at a middle lower portion of the display screen 21. Letters "MODE", "OPEN", "CLOSE", "LIGHT", "TIMER" are fixedly displayed. The fifth display area mainly consists of two portions. A first portion thereof displays the letters "LIGHT", which corresponds to a light-sensing mode, and a second portion thereof displays the letters "TIMER", which corresponds to a timing mode. The letters "LIGHT" and "TIMER" are displayed in sequence below the letters "MODE". The door opening light intensity and the door opening time of the door plate 14 are displayed in sequence below the letters "OPEN". The door closing light intensity and the door closing time of the door plate 14 are displayed in sequence below the letters "CLOSE". The door opening light intensity and the door closing light intensity are displayed on a same line of the fifth display area with the letters "LIGHT", and the door opening time and the door closing time are displayed on a same line with the letters "TIMER" in the fifth display area.

The letters "LIGHT" correspond to the light sensing mode. Specifically, the door opening light intensity displayed below the letters "OPEN" is predetermined to open the entrance. When the light intensity of the ambient light displayed below the letters "LIGHT-INTENSITY" is greater than the door opening light intensity, the driving mechanism 15 drives the door plate 14 to expose the entrance. When the light intensity of the ambient light displayed below the letters "LIGHT-INTENSITY" is less than the door closing light intensity displayed below the letters "CLOSE", the driving mechanism 15 drives the door plate 14 to close the entrance.

The letters "TIMER" is corresponding to timing mode. Specifically, the door opening time is predetermined. When the current time displayed below the letters "CLOCK" reaches the door opening time displayed below the letters "OPEN", the door plate 14 is opened to expose the entrance. When the current time displayed below the letters "CLOCK" reaches the door closing time displayed below the letters "CLOSE", the door plate 14 is closed to close the entrance.

Switching between the light-sensing mode and the timing mode is illustrated below.

When the door opening light intensity displayed below the letters "OPEN" is between 01-99%, the door opening time displayed below the letters "OPEN" automatically displays letters "OFF", which means that the automatic animal door is in the light-sensing mode and the timing mode is closed. The display contents shown below the letters "CLOSE" are similarly displayed.

When the door opening time displayed below the letters "OPEN" is in a format of hour: minute, the door opening light intensity displayed below the letters "OPEN" automatically displays "--", which means that the automatic animal door is in the timing mode and the light-sensing mode is closed. The display contents shown below the letters "CLOSE" are similarly displayed.

In some embodiments, the automatic animal door 1 further comprises a circuit board 22. The circuit board 22 is disposed in the third accommodating groove 171. The circuit board 22 is disposed on one side of the display screen 21 facing the top plate 13. The circuit board 22 is connected with the display screen 21. The battery 18 is disposed in the third accommodating groove 171. The battery 18 is connected with the driving mechanism 15, the circuit board 22, and the display screen 21. The battery 18, the driving mechanism 15, and the circuit board 22 are disposed side by side. In this way, a space in the third accommodating groove 171 is fully utilized, structures of the battery 18, the driving mechanism 15, and the circuit board 22 are capable of being made more compact, and the space of the third accommodating groove 171 is saved.

In some embodiments, the automatic animal door 1 further comprise a power interface connected with the battery 18. The power interface is connected with the power source through a wire to charge the battery 18. Of course, the power interface may be directly connected with the driving mechanism 15 and the display screen 21 to provide power to the driving mechanism 15 and the display screen 21.

In some embodiments, the automatic animal door 1 further comprises control buttons 23. The control buttons 23 are at least partially disposed outside the cover 17. The control buttons 23 are connected with the circuit board 22. The control buttons 23 are configured to change display content of the display screen 21. For instance, the control buttons 23 are able to change at least one of the door opening light intensity, the door closing light intensity, the door opening time, and the door closing time. The control buttons 23 further control the power on, power off, standby, setting and other states of the automatic animal door 1. In the setting state, the clock, the anti-pinch level, parameters of the light-sensing mode, and parameters of the timing mode of the automatic animal door 1 are set.

In some embodiments, the control buttons 23 comprise an up button, a down button, and a setting button. The up button is short pressed to control the door plate 14 to move upward. The up button is long pressed to control the automatic animal door 1 to turn on, the down button is short pressed to control the door plate 14 to move downward, and the down button is long pressed to control the automatic animal door 1 to turn off. The setting button is long pressed such ad 5 seconds to enter the setting state to adjust the current time below the letters "CLOCK" and the value displayed below the letters "ANTI-PINCH LEVEL". The setting button is short pressed to adjust the display contents of the light-sensing mode and the display contents of the timing mode. The automatic animal door 1 automatically enters a sleep mode after 10 seconds without receiving any operations, and the display screen is turned off at the same time. During a setting process, backlight of the display screen 21 lights up automatically. After the setting is completed, the backlight stays on until the display screen 21 enters the sleep mode after 10 seconds.

In some embodiments, the automatic animal door 1 further comprises a light sensor 24. The light sensor 24 is connected with the driving mechanism 15. The light sensor 24 is configured to detect a light intensity of an ambient light signal and is configured to control the driving mechanism 15 to drive the door plate 14 according to the light intensity of the ambient light signal.

In some embodiments, the light sensor 24 comprises a full-spectrum sensing lamp bead, and the full-spectrum sensing lamp bead is configured to detect the ambient light signal of a full spectrum. The full-spectrum sensing lamp bead is able to identify sunlight, that is, detect a light intensity of the sunlight. The full-spectrum sensing lamp bead is unable to identify car lights or mobile phone lights. That is, when the car lights or the mobile phone lights transmit to the light sensor 24, the light sensor 24 is unable to detect corresponding light intensity, so that the door plate 14 is not controlled to move and misoperations are avoided.

In some alternative embodiments, the light sensor comprises a sensing lamp bead and a full-spectrum lens. Ambient light of a full spectrum is allowed to penetrate the full-spectrum lens, so that the sensing lamp bead detects the ambient light signal of a full spectrum. Similarly, the sensing lamp bead and the full-spectrum lens detect and sense the sunlight and do not sense nor detect the car lights or the mobile phone lights, which avoids misoperations.

In some embodiments, the automatic animal door 1 further comprises a wireless communication module (not shown in the drawings) connected with the driving mechanism 15. The wireless communication module is configured to receive a wireless control instruction and control the driving mechanism 15 to drive the door plate 14 to move according to the wireless control instruction. The user is able to remotely control the automatic animal door 1 through the wireless communication module, such as controlling the door plate 14 to expose or close the entrance. The automatic animal door 1 is allowed to send a status of the door plate 14 to an electronic device of the user, such as a mobile phone or a computer through the wireless communication module, so that the user is able to obtain the status of the door plate 14 in time. The wireless communication module may be a BLUETOOTH communication module, a WIFI communication module, or other wireless communication modules. In some embodiments, the wireless communication module may be integrated on the circuit board 22.

The embodiments, implementations and related technical features of the present disclosure can be combined and replaced with each other without conflict.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified.

The above embodiments of the present disclosure provide a detailed illustration to the automatic animal door. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. An automatic animal door, comprising:
   a first door column as a monolithic construction,
   a second door column as a monolithic construction,
   a top plate,
   a door plate, and
   a driving mechanism;
   wherein the first door column defines a first groove extending along a length direction thereof; the second door column is opposite to the first door column and is spaced apart from the first door column; the second door column defines a second groove extending along a length direction thereof; the first groove is opposite to the second groove;
   wherein the top plate is connected with a top end of the first door column and a top end the second door column; the top plate, the first door column, and the second door column are connected which define an entrance;
   wherein the door plate is disposed between the first door column and the second door column; a first side of the door plate facing the first door column is clamped in the first groove; a second side of the door plate facing the second door column is clamped in the second groove; the door plate is movable along the first groove and the second groove to close or expose the entrance;
   wherein the driving mechanism is disposed on the top plate; the driving mechanism is connected with the door plate to drive the door plate to move along the first groove and the second groove;
   wherein the first door column defines a first opening communicated with the first groove; the first opening is defined on the top end of the first door column; the second door column defines a second opening communicated with the second groove; the second opening is defined on the top end of the second door column;

wherein the top plate comprises a base plate portion, a first limiting portion, and a second limiting portion integrally formed; the base plate portion and the door plate are sequentially disposed in a thickness direction of the automatic animal door; the first limiting portion is disposed on the top end of the first door column, the first limiting portion blocks a portion of the first opening; the first limiting portion prevents the first protruding portion from separating from the first groove; the second limiting portion is disposed on the top end of the second door column; the second limiting portion blocks a portion of the second opening; the second limiting portion prevents the second protruding portion from separating from the second groove.

2. The automatic animal door according to claim 1, wherein the automatic animal door further comprises a bottom plate; the bottom plate is fixedly connected with a bottom end of the first door column and a bottom end of the second door column; a first end, facing the first door column, of the bottom plate is clamped in the first groove; a second end, facing the second door column, of the bottom plate is clamped in the second groove; when the door plate closes the entrance; one end, away from the top plate, of the door plate abuts against the bottom plate.

3. The automatic animal door according to claim 2, wherein a first protruding portion is convexly disposed at a one end, close to the bottom plate, of the first side of the door plate; a second protruding portion is convexly disposed on one end, close to the bottom plate, of the second side of the door plate.

4. The automatic animal door according to claim 3, wherein the first door column comprises a first base plate and a first limiting plate disposed on the first base plate; the first limiting plate comprises a first connecting portion and a first extending portion; the first connecting portion protrudes from the first base plate; the first extending portion extends from one end of the first connecting portion away from the first base plate toward the second door column; the first connecting portion, the first extending portion, and the first base plate form the first groove; the base plate portion defines a first accommodating groove corresponding to the first limiting plate; the first limiting plate is disposed in the first accommodating groove;

wherein the second door column comprises a second base plate and a second limiting plate disposed on the second base plate; the second limiting plate comprises a second connecting portion and a second extending portion; the second connecting portion protrudes from the second base plate; the second extending portion extends from one end of the second connecting portion away from the second base plate toward the first door column; the second connecting portion, the second extending portion, and the second base plate form the second groove; the base plate portion defines a second accommodating groove corresponding to the second limiting plate; the second limiting plate is disposed in the second accommodating groove.

5. The automatic animal door according to claim 4, wherein the base plate portion covers the first base plate and the second base plate; the first limiting plate is disposed on one side of the first base plate facing the base plate portion; the second limiting plate is disposed on one side of the second base plate facing the base plate portion.

6. The automatic animal door according to claim 3, wherein a corner of the first limiting portion away from the second limiting portion is arc-shaped, and a corner of the second limiting portion away from the first limiting portion is arc-shaped.

7. The automatic animal door according to claim 1, wherein the driving mechanism comprises a driving motor and a gear; the driving motor is connected with the gear and drives the gear to rotate; tooth holes are defined on the door plate along a length direction thereof; and the gear is engaged with any one of the tooth holes to drive the door plate to move.

8. The automatic animal door according to claim 1, wherein the automatic animal door further comprises a cover covering the top plate; the cover defines a third accommodating groove facing the top plate; the driving mechanism is accommodated in the third accommodating groove; the cover comprises an upper cover plate disposed along a moving direction of the door plate; the upper cover plate is disposed away from the bottom plate; the upper cover plate defines an upper notch; the door plate is allowed to pass through the upper cover plate from the upper notch.

9. The automatic animal door according to claim 8, wherein the automatic animal door further comprises a battery and a solar panel; the battery is disposed in the third accommodating groove; the battery is connected with the driving mechanism; the battery supplies power to the driving mechanism; the solar panel is disposed outside the cover; the solar panel is connected with the battery to supply power to the battery.

10. The automatic animal door according to claim 9, wherein the automatic animal door further comprises a connecting rod; a first end of the connecting rod is connected with the solar panel; a second end of the connecting rod is connected with the cover; the solar panel is spaced apart from the cover.

11. The automatic animal door according to claim 10, wherein the connecting rod is rotatable relative to the cover to drive the solar panel to rotate relative to the cover.

12. The automatic animal door according to claim 10, wherein the solar panel is rotatably connected with the connecting rod, and the solar panel is rotatable relative to the connecting rod.

13. The automatic animal door according to claim 8, wherein the automatic animal door further comprises a display screen disposed in the third accommodating groove; the cover comprises a light-transmitting area; the light-transmitting area directly faces the display screen.

14. The automatic animal door according to claim 13, wherein the display screen comprises display areas; the display areas display at least one of current time, a remaining electric quantity, a light intensity of ambient light, a door opening light intensity, a door closing light intensity, door opening time, and door closing time;

when the light intensity of the ambient light is greater than the door opening light intensity, the driving mechanism drives the door plate to expose the entrance; when the light intensity of the ambient light is less than the door closing light intensity, the driving mechanism drives the door plate to close the entrance; when the current time reaches the door opening time, the driving mechanism drives the door plate to expose the entrance; when the current time reaches the door closing time, the driving mechanism drives the door plate to close the entrance.

15. The automatic animal door according to claim 13, wherein the automatic animal door further comprises a circuit board and a battery, the circuit board is disposed in the third accommodating groove; the circuit board is disposed on one side of the display screen facing the top plate; the circuit board is connected with the display screen; the battery is disposed in the third accommodating groove; the battery is connected with the driving mechanism, the circuit board, and the display screen; the battery, the driving mechanism, and the circuit board are disposed side by side.

16. The automatic animal door according to claim 15, wherein the automatic animal door further comprises control buttons; the control buttons are at least partially disposed outside the cover; the control buttons are connected with the circuit board, the control buttons are configured to change display contents of the display screen.

17. The automatic animal door according to claim 1, wherein the automatic animal door further comprises a light sensor; the light sensor is connected with the driving mechanism; the light sensor is configured to detect a light intensity of a ambient light signal and is configured to control the driving mechanism to drive the door plate according to the light intensity of the ambient light signal.

18. The automatic animal door according to claim 17, wherein the light sensor comprises a full-spectrum sensing lamp bead and the full-spectrum sensing lamp bead is configured to detect the ambient light signal of a full spectrum.

19. The automatic animal door according to claim 17, wherein the light sensor comprises a sensing lamp bead and a full-spectrum lens; ambient light of a full spectrum is allowed to penetrate the full-spectrum lens, so that the sensing lamp bead detects the ambient light signal of a full spectrum.

20. The automatic animal door according to claim 1, wherein the automatic animal door further comprises a wireless communication module connected with the driving mechanism; the wireless communication module is configured to receive a wireless control instruction and control the driving mechanism to drive the door plate to move according to the wireless control instruction.

\* \* \* \* \*